United States Patent [19]

Ishizuki et al.

[11] Patent Number: 4,939,930
[45] Date of Patent: Jul. 10, 1990

[54] ELECTRIC CAPACITANCE STRAIN GAUGE

[75] Inventors: Toshio Ishizuki; Yoshio Fukuda, both of Hitachi; Ken-ichi Honda, Katsuta, all of Japan

[73] Assignees: Hitachi, Ltd., Tokyo; Hitachi Naka Electronics Co., Ltd., Ibaraki, both of Japan

[21] Appl. No.: 336,784

[22] Filed: Apr. 13, 1989

[30] Foreign Application Priority Data

Apr. 13, 1988 [JP] Japan .................................. 63-89085

[51] Int. Cl.⁵ .............................................. G01L 1/00
[52] U.S. Cl. ..................................... 73/780; 73/862.64
[58] Field of Search ..................... 73/780, 862.64, 718, 73/724, 862.63; 361/280, 283; 177/210 C

[56] References Cited

U.S. PATENT DOCUMENTS 3,206,970 9/1965 Dally et al. ..................... 361/280 X
4,649,759 3/1987 Lee ..................................... 73/862.64

Primary Examiner—Jerry W. Myracle
Attorney, Agent, or Firm—Antonelli, Terry, Stout & Kraus

[57] ABSTRACT

The present invention is an electric capacitance strain gauge provided with a pair of installing frames connected to each other, electrical insulating members with a stepped shape fixed onto the said pair of installing frames by insertion and two pairs of electrode plates with a stepped shape fixed onto the said electrical insulating members by insertion. As the electrical insulating members and the installing frames are positioned at a stepped part of the stepped shape when the electrical insulating members are fixed on the installing frames by insertion, and positioning of the electrode plates and the electrical insulating members is carried out at a stepped part of the electrode plates when the electrode plates are installed on the electrical insulating members by insertion, the relative positions of each member can be accurately determined. As the relative positions of each member of the electric capacitance strain gauge is accurately determined, the possibility that characteristics of the electric capacitance strain gauge are affected by each electric capacitance strain gauge is reduced.

3 Claims, 3 Drawing Sheets

ELECTRIC CAPACITANCE STRAIN GAUGE

BACKGROUND OF THE INVENTION

The present invention relates to an electric capacitance strain gauge and particularly to a technique for unifying the gauge characteristics of the electric capacitance strain gauge as much as possible.

The conventional electric capacitance strain gauge is shown in FIG. 1. The electric capacitance strain gauge shown in FIG. 1 is a strain gauge described at pages 5 to 8 of the 19th Stress and Strain Measurement Symposium Lecture Paper Collection of the Japan Nondestructive Inspection Association.

The constitution of the electric capacitance strain gauge shown in FIG. 1 is as follows.

The installing frames 2 and 3 made of heat resisting conductive metal cross three-dimensionally without touching each other at the central part. Two pairs of electrode plates 5a, 5b, 6a and 6b are fixed on the opposing inner surfaces of the installing frames 2 and 3 with an electrically insulated ceramic adhesive material 4. A fulcrum spring 7 is spot welded at the right ends of the installing frames 2 and 3. Incidentally, the left end of the electric capacitance strain gauge is attached to a measured material 1 by spot welding.

In the case where the measured material 1 is extended, the space between the electrode plates 5a and 5b constituting a pair becomes large and conversely, space between the electrode plates 6a and 6b constituting another pair becomes small, which makes the polarity of the electric capacitance change. Then, the electric capacitance change is added and measured with each of the electrode pairs adjacent to an electrically balanced circuit. In addition, the temperature is compensated for as an electric capacitance change caused by other environmental factors (for example, temperature change).

In addition, the gauge factor Ks, which is the fundamental characteristic of the electric capacitance strain gauge, is expressed as follows using dimensions lA, lD, GL, $D_A$, $D_D$ and L.

$$KS = -\left(\frac{lA}{D_A} + \frac{lD}{D_D}\right) \times \frac{GL}{L}$$

And it can be decided from the dimensional shape of the gauge set at the beginning. Therefore, if the electrode plates 5a, 5b, 6a and 6b are not installed accurately on the installing frames 2 and 3, the fundamental characteristic of the gauge is not known until each dimension of the gauge is measured again after fixing the electrode plates 5a, 5b, 6a and 6b on the installing frames 2 and 3 since the dimensions differ in each gauge.

Here the rear faces of the electrode plates 5a, 5b, 6a and 6b are fixed on the installing frames 2 and 3 with an electrically insulated ceramic adhesive material 4. But trouble occurs in that it is impossible to make the thickness of the adhesive a constant amount as the ceramic adhesive material cannot be applied uniformly on the electrode plates 5a, 5b, 6a and 6b, that they cannot be adhered at room temperature and heat setting processing is necessary, but temperature management is difficult and the yield is not satisfactory, and that the insulation resistance of the adhesive material is lowered at high temperature in general and becomes unusable (if the thickness of the adhesive is increased, the insulation characteristic is improved, but air bubbles are generated and adhesive strength is lowered), which limits the working temperature to about 600° C.

As it is almost impossible to accurately install the electrode plates 5a, 5b, 6a and 6b at the specified positions of the installing frames 2 and 3, it is impossible to mass-produce them with a constant gauge factor, which is the fundamental characteristic of the gauge. It is also difficult to measure the dimensions of each part with accuracy after installing the electric capacitance strain gauge on the measured material 1, and it is impossible to measure the strain accurately.

There is a problem in the above conventional technique in that dimnesional accuracy for installing the electrode plates is not considered and those with different characteristics for each gauge are produced, which reduces the strain measurement accuracy, and that electrode plate installation strength is not considered either, and which lacks reliable strength.

SUMMARY OF THE INVENTION

The object of the present invention is to make the characteristics of each electric capacitance strain gauge approximately uniform and further to enable strain to be measured more stably even at high temperatures.

According to the present invention to achieve the above object, an electric capacitance strain gauge is provided with a pair of installing frames connected to each other, electrical insulating members in the stepped shape fixed to the above pair of installing frames by insertion and two pairs of electrode plates in the stepped shape fixed to the above electrical insulating member by insertion.

According to this constitution, the electrical insulating members and the installing frames are positioned at a stepped part of the stepped shape when the electrical insulating members are fixed onto the installing frames by insertion, and the electrode plates and the electrical insulating members are positioned at a stepped part of the electrode plates when the electrode plates are installed on the electrical insulating members by insertion, the relative positional relation of each member can be decided with accuracy. As the relative positional relation of each member of the electric capacitance strain gauge is accurately decided, the possibility that the characteristics of the electric capacitance strain gauge are affected for each electric capacitance strain gauge is reduced.

DESCRIPTION OF THE PREFERRED EMBODIMENTS

Figure 1:
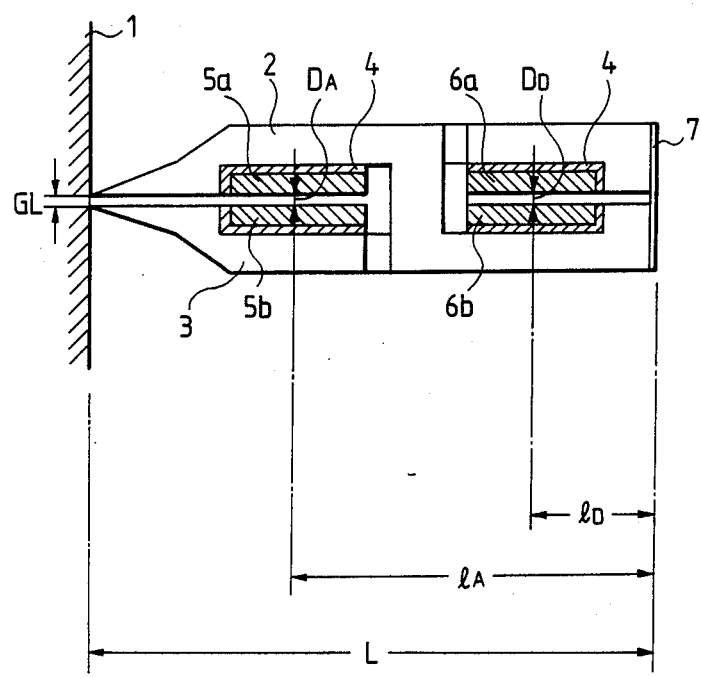
FIG. 1 is an overall view with a partial cross section of a conventional strain gauge.
Figure 2:
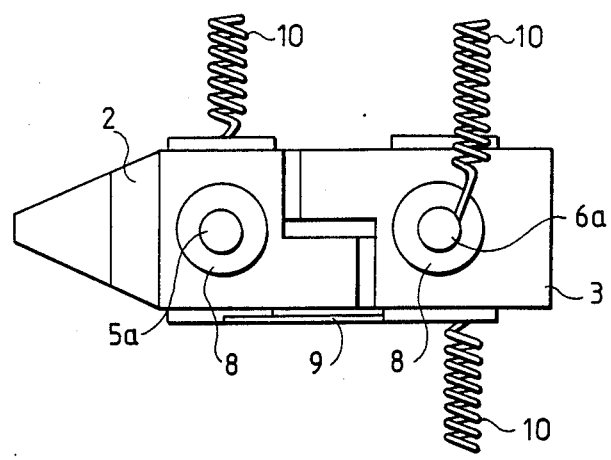
FIG. 2 is an overall view of a strain gauge according to a preferred embodiment of the present invention.
Figure 3:
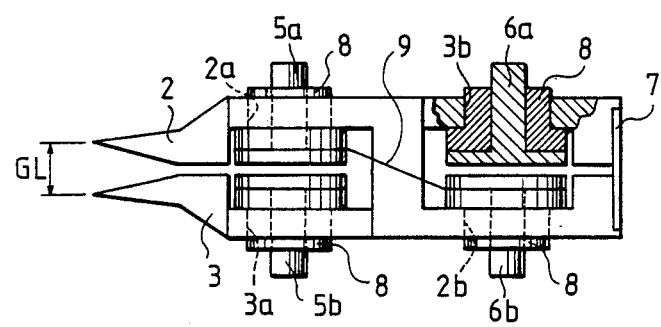
FIG. 3 is a side view with a partial cross section of FIG. 2.

Each of the preferred embodiments of the present invention is explained referring to FIG. 2 to FIG. 5.

An electric capacitance strain gauge according to this preferred embodiment measures the strain of a measured material 1, and installing frames 2, 3, electrode plates 5a, 5b, 6a, 6b and a fulcrum spring 7 is made of conductive metal. Here, as the main purpose is to use the electric capacitance strain gauge in a high-temperature atmosphere, the electric capacitance strain gauge is made of a heat resisting metal, for example, an Inconel material.

Holes 2a, 2b, 3a and 3b are provided through which stepped cylinder collars 8 can be inserted into the installing frames 2 and 3.

The stepped cylinder collars 8 are made of an alumina ceramic material having high insulation properties at a high temperature.

The electrode plates 5a, 5b, 6a and 6b have a stepped shape having a crosssection in the shape of the letter T so that they can be inserted into the stepped cylinder collars 8.

Each of the electrode plates 5a and 5b provided on the installing frames 2 and 3 forms a pair of condensers and each of the electrode plates 6a and 6b forms another pair of condensers, which forms two pairs of condensers to have an arrangement of electrode plates which is capable of measuring the displacement between the installing frames 2 and 3 as a change of electric capacity.

Figure 4:
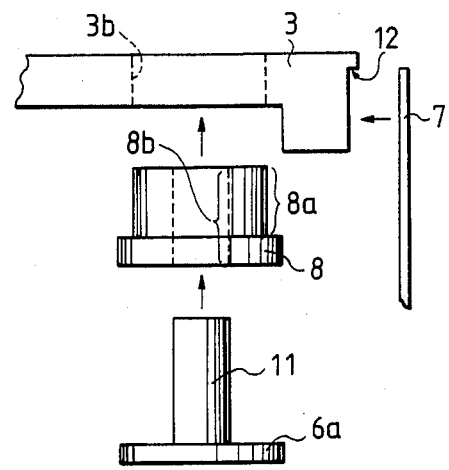
FIG. 4 is an exploded view of a main part in FIG. 3.

To assemble this, the ceramic adhesive material is first applied to the inner circumference of the holes 2a, 2b, 3a and 3b of the installing frames 2 and 3, or to the outer circumference 8a of the stepped cylinder collars 8, as shown in FIG. 4, and the stepped cylinder collars 8 are inserted in holes 2a, 2b, 3a and 3b. Next, the ceramic adhesive material is applied to the cylinder inner circumference 8b of the stepped cylinder collars 8 or the outer circumference of an insertion pillar part 11 of the electrode plates 5a, 5b, 6a and 6b, and the insertion pillar part 11 is inserted into the cylinder of the stepped cylinder collar 8. And it is fixed by heat setting. Next, the fulcrum spring 7 is assembled to the ends of the installing frames 2 and 3 by spot welding. Here, a stepped part 12 is provided at the ends of the installing frames 2 and 3, and a strain gauge with a constant space between the installing frames 2 and 3 can be produced by executing processing accuracy management for the fulcrum spring 7.

In the conventional example shown in FIG. 1, a special ceramic insulating material should be used for electrical insulation, but anything with a large adhesive force at a high temperature can be used in this preferred embodiment.

The conventional electric capacitance strain gauge is installed on the measured material 1 by spot welding, but the installing tip of the conventional electric capacitance strain gauge is deformed by deposition. Therefore, in order to reduce a change of the shape caused by deposition, the electric capacitance strain gauge of this preferred embodiment is made in a shape to make linear contact with the measured material 1.

The electric capacitance strain gauge and an electric capacitance amplifier of this preferred embodiment shoud be connected by a shielded lead wire, but the rigidity of the shielded lead wire which can resist high temperature is large and it cannot be directly installed on the electrode plates 5a, 5b, 6a and 6b. Therefore, a film ribbon wire 10 is installed spirally in advance on the electrode plates 5a, 5b, 6a and 6b by spot welding. External force is not applied to the strain gauge when connecting the shielded lead wire because this ribbon wire 10 and the shield lead wire are connected to each other. In addition, as the electrode plates 5a and 6b are connected in advance by a film-state ribbon wire (jumper wire) to form two sides of an electrically balanced circuit, the shielded lead wire can be wired with three wires and the electric balanced circuit can be easily formed.

Figure 5:
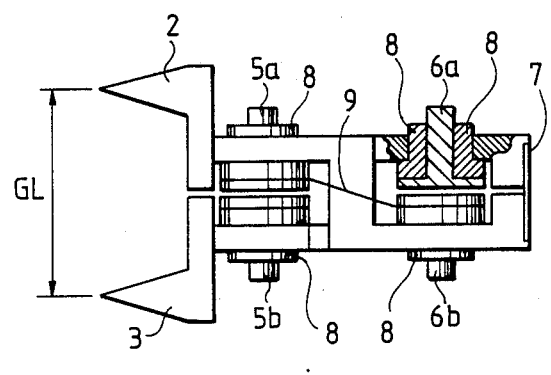
FIG. 5 is an overall view with a partial cross section of a strain gauge according to another preferred embodiment of the present invention.

A variation of this preferred embodiment is shown in FIG. 5. A gauge with an arbitrary dimension of the gauge length (GL) can be easily produced just by changing the shape of the tip end at the side on which the measured material is installed. In addition, the opposing surfaces of the electrode plates 5a, 5b, 6a and 6b form a rectangle. But by making this circular, the shape of the opposing surface of the electrode plates 5a, 5b, 6a and 6b is always the same, even if they are installed at any rotational angle with the insertion pillar part 11 as the rotational center, and an electric capacitance strain gauge can be produced dispersing the gauge characteristic.

According to each of the preferred embodiments of the present invention, as the relative positions of each constituting member can be made constant without using a special tool, members with uniform gauge characteristics can be produced. Moreover, a high level of insulation can be obtained even at a high temperature by inserting the collars 8 made of ceramic between the installing frames 2, 3 and the electrodes 5a, 5b, 6a, 6b, and thus the maximum working temperature is raised to about 800° C. compared with the working temperature of the conventional strain gauge which is about 600° C.

If the electric capacitance strain gauge is used in a normal temperature environment or an environment close to being normal, the material for the collar 8 need not be ceramic but of another electrical insulating material, and the electrode 5a, 5b, 6a, 6b with the collars 8 and the collars 8 with the installing frames 2,3 need not be fixed with an adhesive material but by a fixing method to engage them tightly with each other or a mechanical connecting method.

What is claimed is:

1. An electric capacitance strain gauge provided with a pair of installing frames connected with each other, electrical insulating members with a stepped shape fixed on said pair of installing frames by insertion, and two pairs of electrode plates with a stepped shaped fixed onto said electrical insulating members by insertion, characterized in that a member for connecting the installing frames which constitutes a pair is a plate spring deposited at the end of each of said installing frames, and that a stepped part for positioning the plate spring is provided at the end surface of said installing frames.

2. An electric capacitance strain gauge provided with a pair of installing frames connected with each other, electrical insulating members with a stepped shape fixed on said pair of installing frames by insertion, and two pairs of electrode plates with a stepped shaped fixed onto the said electrical insulating members by insertion, characterized in that diagonally opposing electrode plates of said pairs of electrode plates are connected to each other with a jumper wire.

3. An electric capacitance strain gauge provided with a pair of installing frames connected with each other, electrical insulating members with a stepped shaped fixed on said pair of installing frame by insertion, and two pairs of electrode plates with a stepped shape fixed onto said electrical insulating members by insertion, characterized in that the ends of the installing frames on a measured material side are shaped to make linear contact with a measured material.

* * * * *